United States Patent Office 3,278,198
Patented Oct. 11, 1966

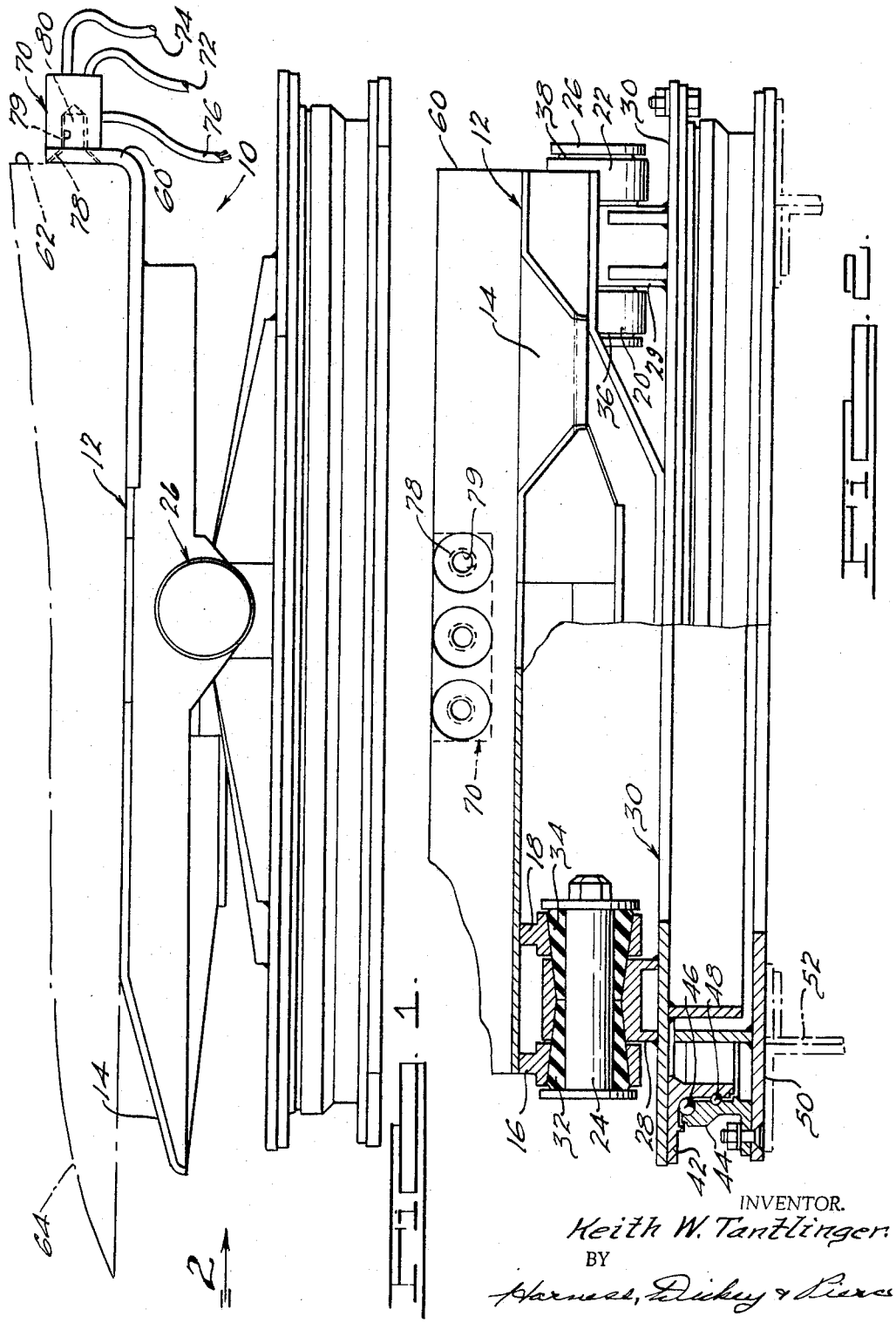

3,278,198
TRACTOR FIFTH-WHEEL WITH SERVICE
LINE CONNECTOR
Keith W. Tantlinger, Grosse Pointe Shores, Mich., assignor to Fruehauf Corporation, Detroit, Mich., a corporation of Michigan
Filed Mar. 17, 1965, Ser. No. 440,552
3 Claims. (Cl. 280—421)

This application relates generally to fifth wheels and more particularly to an improved anti-friction fifth wheel with integral stabilizing and aligning means and an automatic service line connector.

It often occurs that the tractor of a semi-trailer is required to turn relatively sharply with respect to the trailer to negotiate a corner or when backing into a loading dock. When turning or backing is coupled with an ascent or descent, the possibility of the trailer and tractor overturning is greatly increased due to the fact that the pivotal axis of a conventional fifth wheel is rotated towards the condition wherein it is parallel to the longitudinal axis of the trailer. For example, when a tractor having a conventional fifth wheel is orientated at 90° to the trailer, the pivotal axis of the fifth wheel is orientated parallel to the longitudinal axis of the trailer and the tractor is therefore unable to exert any stabilizing influence on the trailer against rotation about the longitudinal axis of the trailer. Thus, the only factor that prevents tipping of the trailer is the trailer wheel suspension.

It has been heretofore proposed to mount a fifth wheel so that it rotates upon turning of the tractor relative to a trailer to maintain the pivotal axis thereof at a right angle to the longitudinal axis of the trailer. However, such known fifth wheel constructions were not only inefficient but did not provide for initial orientation of the fifth wheel relative to the trailer to facilitate coupling therebetween.

A fifth wheel in accordance with the instant invention solves this problem by providing for rotation of the fifth wheel about a vertical axis whereby the horizontal axis of roation of the fifth wheel relative to the tractor is always maintained normal to the longitudinal axis of the trailer and is thereby capable of exerting a stabilizing influence on the trailer.

In accordance with another feature of the instant invention, the fifth wheel is provided with means for initially orientating the fifth wheel relative to the trailer to facilitate acceptance of a kingpin and effect coupling of the trailer to a tractor.

Yet another feature of the instant invention is a means for automatically coupling air, electrical and other service lines between the tractor and trailer.

Accordingly, one object of the instant invention is an improved fifth wheel.

Another object of the instant invention is a fifth wheel that is rotatable about a vertical axis.

Another object is an improved bearing structure for a fifth wheel.

Another object is a means for stabilizing a fifth wheel to facilitate coupling of the kingpin of a trailer thereto.

Another object is a fifth wheel assembly that provides for automatic coupling of air, electrical or other service lines.

Other objects and advantages of the instant invention will be apparent from the following specification, claims and drawings, wherein:

FIGURE 1 is a side elevational view of the fifth wheel in accordance with the instant invention; and FIGURE 2 is a view, partially in section, taken in the direction of the arrow 2 of FIG. 1.

As best seen in FIGURE 1 of the drawings, a fifth wheel 10, in accordance with an exemplary constructed embodiment of the instant invention, comprises a skid plate 12 having a pair of rearwardly and downwardly directed leg portions, one of which is shown and designated by the numeral 14. A kingpin (not shown) of conventional construction is acceptable between the leg portions of the skid plate 12 of the fifth wheel 10 and is coupled thereto in the conventional manner.

A plurality of downwardly extending shaft supports 16, 18, 20 and 22 are secured to the underside of the skid plate 12 for the support of a pair of trunnion shafts 24 and 26. The shafts 24 and 26 extend through the shaft supports 16, 18, 20 and 22 and are also supported in complementary bearings 28 and 29, respectively, which in turn are mounted on a plate 30. Suitable bushings 32, 34, 36 and 38 are provided to isolate the shaft supports 16, 18, 20 and 22, bearings 28 and 29 from the shafts 24 and 26.

In accordance with one feature of the instant invention, the plate 30 is provided with an annular upper ball bearing race 42 that is nested within a complementary lower ball bearing race 44. A plurality of ball bearings 46 and 48 are disposed between the races 42 and 44 to accommodate both vertical and laterally directed loads on the races 42 and 44. The lower race 44 is secured to a lower plate 50 which is in turn secured to the frame 52 of a tractor (not shown).

It should be apparent that the upper assembly of the fifth wheel 10 comprising the skid plate 12, trunnion shafts 24 and 26, plate 30 and upper ball bearing race 42 are rotatable relative to the lower ball bearing race 44, base plate 50 and tractor frame 52, to maintain the central axis of the trunnion shafts 24 and 26 at a right angle to the longitudinal axis of the trailer and thereby effect stabilization of the trailer about its longitudinal axis.

In accordance with another feature of the instant invention, the top plate 12 is provided with an upwardly extending flange portion 60 at the front end thereof for engagement with a frontal edge portion 62 of a semi-trailer, shown in phantom lines and designated by the numeral 64. Thus, when the trailer 64 moves toward the fifth wheel 10, the upwardly extending flange 60 on the skid plate 12 of the fifth wheel 10 engages the frontal surface 62 of the trailer 64 to effect rotation of the upper assembly of the fifth wheel 10 into proper coupling position relative to the trailer 64 wherein the pivotal axis of the shafts 24 and 26 extends laterally of the trailer 64. Furthermore, after coupling the central axis of the shafts 24 and 26 is maintained parallel to the frontal surface 62 of the trailer 64, or in other words, normal to the longitudinal axis of the trailer 64, by interengagement between the flange 60 and the trailer 64. Thus, tipping or rotation of the trailer about its own longitudinal axis is restrained since torque is transferred through the shafts 24 and 26 to the bearing plate 30, thence to the upper race 42, lower race 44 to the lower plate 50 and the tractor frame 52.

In accordance with yet another feature of the instant invention, a brake and electrical line receptacle 70 is mounted on the flange portion 60 of the skid plate 12. Suitable brake lines 72 and 74 and an electrical conduit 76 are connected to socket-type connectors within the receptacle 70 for the acceptance of prong-type connectors, respectively, for the air and electrical lines. One of the connectors is shown and designated by the numeral 80. The connector 80 extends forwardly of the frontal surface 62 of the trailer 64, the flange 60 on the skid plate 12 being provided with a tapered conical seat 78 to facilitate entrance of the prong-like connector 80 into its complementary recess designated by the numeral 79.

After coupling, the skid plate 12, flange 60 and receptacle 70, are maintained in fixed relation to the trailer 64 rendering the foregoing method of coupling the air and electrical lines practical. Relative movement between the trailer and the skid plate 12 and associated structure would make such coupling impossible. Thus, mounting of the skid plate 12 for rotation about a vertical axis relative to the tractor frame 52 serves not only to preclude or minimize rotation of the trailer or tipping of the trailer about its own longitiudinal axis, but makes it possible to effect quick connection and disconnection of the service lines for the trailer.

From the foregoing description it should be apparent that the instant invention provides for the ball bearing mounting of the skid plate of the fifth wheel to maximize the ability of the fifth wheel to resist rotation of the trailer about its own longitudinal axis, effects alignment of the skid plate of the fifth wheel with the trailer to facilitate coupling therebetween, and effects automatic connection of the air and electrical service lines leading from the tractor to the trailer. The foregoing features offer a material step forward in the over-the-road transportation art.

It is to be understood that the improved construction of the fifth wheel herein disclosed and described is presented for the purpose of explanation and illustration and is not intended to indicate limits of the invention, the scope of which is defined by the appended claims.

What is claimed is:

1. A fifth wheel construction for heavy duty over-the-road trailers and the like comprising
a lower plate secured to the frame of the tractor,
a lower ball bearing race on said lower plate with the central axis thereof extending vertically,
an upper ball bearing race vertically aligned with said lower race and rotatable relative thereto about a vertical axis,
an upper plate secured to said upper ball bearing race,
a bearing on said upper plate having a horizontally extending central axis,
a skid plate pivotally supported by said bearing for rotation about said horizontal axis relative to said upper plate, said skid plate having a slot for the acceptance of a kingpin, and
a flange portion on said skid plate extending upwardly above an uppermost surface thereof for engagement with the frontal face of said trailer to effect rotation of said skid plate into a condition wherein said slot is generally aligned with the longitudinal axis of said trailer.

2. A fifth wheel construction for heavy duty over-the-road trailers and the like comprising
a lower plate secured to the frame of the tractor,
a lower ball bearing race on said lower plate with the central axis thereof extending vertically,
an upper ball bearing race vertically aligned with said lower race and rotatable relative thereto about a vertical axis,
an upper plate secured to said upper ball bearing race,
a bearing on said upper plate having a horizontally extending central axis,
a skid plate pivotally supported by said bearing for rotation about said horizontal axis relative to said upper plate, said skid plate having a slot for the acceptance of a kingpin, and
a flange portion on said skid plate extending parallel to the axis of rotation thereof and upwardly above an uppermost surface thereof for engagement with the frontal face of said trailer to effect rotation of said skid plate into a condition wherein said slot is generally aligned with the longitudinal axis of said trailer.

3. A fifth wheel construction for heavy duty over-the-road trailers and the like comprising
a lower plate secured to the frame of the tractor,
a lower ball bearing race on said lower plate with the central axis thereof extending vertically,
an upper ball bearing race vertically aligned with said lower race and rotatable relative thereto about a vertical axis,
an upper plate secured to said upper ball bearing race,
a bearing on said upper plate having a horizontally extending central axis,
a skid plate pivotally supported by said bearing for rotation about said horizontal axis relative to said upper plate, said skid plate having a slot for the acceptance of a kingpin,
a flange portion on said skid plate extending parallel to the axis of rotation thereof and upwardly above an uppermost surface thereof for engagement with the frontal face of said trailer to effect rotation of said skid plate into a condition wherein said slot is generally aligned with the longitudinal axis of said trailer, and
a receptacle on the flange of said skid plate for receiving a service line connector on the trailer.

References Cited by the Examiner

UNITED STATES PATENTS

| | | | |
|---|---|---|---|
| 2,119,460 | 5/1938 | Gurton et al. | 280—421 |
| 2,188,727 | 1/1940 | Soulis | 280—438 |
| 3,063,739 | 11/1962 | Davies | 280—438 |
| 3,096,099 | 7/1963 | Bowles et al. | 280—433 X |
| 3,165,335 | 1/1965 | Methven | 280—421 |

FOREIGN PATENTS

| | | |
|---|---|---|
| 111,071 | 7/1940 | Australia. |
| 421,269 | 5/1947 | Italy. |
| 987,290 | 4/1951 | France. |

LEO FRIAGLIA, *Primary Examiner.*